Patented Nov. 10, 1953

2,658,877

UNITED STATES PATENT OFFICE 2,658,877

SELF-EXTINGUISHING ALKENYLBENZENE COPOLYMER COMPOSITION

Robert R. Dreisbach and George B. Sterling, Midland, Mich., assignors to The Dow Chemical Company, Midland, Mich., a corporation of Delaware No Drawing. Application February 9, 1952, Serial No. 270,894

4 Claims. (Cl. 260—2.5)

This invention relates to a composition consisting essentially of a fire retardant compound and copolymeric alkenylbenzenes which composition does not support combustion and is not materially softened by the fire retardant. It relates in particular to a composition having the desirable properties of polystyrene but which is self-extinguishing when exposed to flame.

Polystyrene is widely used in making molded articles and in the preparation of expanded cellular insulation. It has the disadvantage of being readily combustible when exposed to flame. It would be highly desirable to incorporate enough of a fire retardant in a polymer having the properties of polystyrene to make a composition which will not support combustion. Unfortunately, however, attempts to produce such compositions have resulted in an undesirable decrease in various of the important properties of the polymer. For example, when various brominated or chlorinated hydrocarbons are blended with polystyrene in attempts to protect it against combustion, the product is less resistant to distortion by heat than is the original polymer. Further, the halogenated compounds intended to give protection tend to decompose either when heated or when exposed to light, giving the polymer a dark color. When organic stabilizers, such as phenyl or other salicylates, are added to prevent decomposition of the flame retardant, they act as plasticizers for the polymer and depress the softening point of the composition. Hence, when polystyrene is made self-extinguishing by the addition of halohydrocarbons it loses valuable properties and when the halohydrocarbons are stabilized against discoloration due to light the polymer composition is markedly inferior to polystyrene alone except for the sole property of combustibility. For many uses, polystyrene articles should have a heat distortion temperature (ASTM D648-45T) of about 80° C., but the incorporation therein of halohydrocarbons alone may reduce the heat distortion temperature to 65°-70° C., and the presence of light stabilizers for the fire retardant agent may reduce the value even further. The heat distortion temperature of expanded cellular polystyrene foam, used for insulation and decorative purposes, is lower than that of rigid molded polystyrene, and such cellular articles, which present a greater fire hazard than dense moldings, should have high heat distortion temperatures, if possible.

It is the principal object of this invention to provide a light stable composition of matter comprising an alkenylbenzene copolymer which has a close resemblance to polystyrene in all major properties, the composition having the property of being self-extinguishing when exposed to flame and having a heat distortion temperature of at least 80° C.

It has now been found that the desired results are obtained when a composition is prepared consisting essentially of from 3 to 5 per cent by weight of 1,2,3,4-tetrabromobutane uniformly dispersed in from 97 to 95 per cent of a binary copolymer of 75 to 90 per cent styrene and complementarily from 25 to 10 per cent of α-methylstyrene. Such a composition is self-extinguishing, it has a heat distortion temperature over 80° C., and, surprisingly, requires no added agent to protect the tetrabromobutane from the effects of light. Whereas tetrabromobutane turns dark in polystyrene compositions when exposed to light, the new compositions remain unaffected by light.

In a specific example, 4.2 parts by weight of 1,2,3,4-tetrabromobutane was mixed intimately with 95.8 parts by weight of a copolymer of 85 per cent styrene and 15 per cent α-methylstyrene. The mixture was dissolved under pressure in methyl chloride, the solution was heated and then allowed to expand suddenly through an orifice to make an expanded cellular foam. The product had a heat distortion temperature of 82° C., remained colorless when exposed to ultraviolet radiations in a Fadeometer for 24 hours, and was immediately self-extinguishing when exposed to a flame. By way of contrast, when only 3 per cent of the tetrabromobutane was mixed in the same way with 97 per cent by weight of polystyrene, and made into an expanded cellular foam, it had a heat distortion point of 68° C. and turned brown when exposed for 24 hours in the Fadeometer. This sample was also self-extinguishing, but lacked general utility because of its low transition temperature and its instability to light.

In similar tests carried out on copolymers of styrene with as much as 25 per cent or as little as 10 per cent of α-methylstyrene, self-extinguishing and light stable compositions are obtained with from 3 to 5 per cent by weight of tetrabromobutane, and such compositions, both in the form of dense moldings and of expanded cellular foam, have heat distortion values over 80° C. Such compositions have all of the desirable characteristics of polystyrene and have, in addition, the added attributes of fire-resistance coupled with light stability and high transition point temperature.

(The transition point, mentioned occasionally herein, is the "second-order transition point" which may be defined as a narrow temperature region in which is observed an abrupt change in many thermodynamic properties of a thermoplastic. In the case of many plastics, including those here concerned, the heat distortion temperature closely approximates the said transition point.)

Dyes, pigments or fillers which may be used in the present compositions are not deemed to be among the essential constituents referred to in the appended claims.

We claim:

1. A composition of matter consisting essentially of (A) from 95 to 97 per cent by weight of a copolymer of from 75 to 90 per cent styrene and correspondingly from 25 to 10 per cent $\alpha$-methylstyrene and (B) from 5 to 3 per cent by weight of 1,2,3,4-tetrabromobutane.

2. A composition of matter consisting essentially of about 96 per cent of a copolymer of about 85 per cent styrene and 15 per cent $\alpha$-methylstyrene, and about 4 per cent of 1,2,3,4-tetrabromobutane.

3. A self-extinguishing expanded cellular foam whose composition is that claimed in claim 1.

4. A self-extinguishing expanded cellular foam whose composition is that claimed in claim 2.

ROBERT R. DREISBACH.
GEORGE B. STERLING.

References Cited in the file of this patent

UNITED STATES PATENTS

| Number | Name | Date |
|---|---|---|
| 2,532,242 | Ott | Nov. 28, 1950 |
| 2,533,629 | Rosenthal | Dec. 12, 1950 |
| 2,556,459 | Wesp | June 12, 1951 |

FOREIGN PATENTS

| Number | Country | Date |
|---|---|---|
| 554,602 | Great Britain | July 12, 1943 |
| 661,002 | Great Britain | Nov. 14, 1951 |